United States Patent
Hayashida et al.

(10) Patent No.: US 11,633,815 B2
(45) Date of Patent: Apr. 25, 2023

(54) SOLDER PASTE

(71) Applicant: SENJU METAL INDUSTRY CO., LTD., Tokyo (JP)

(72) Inventors: Toru Hayashida, Tokyo (JP); Shunsaku Yoshikawa, Tokyo (JP); Takashi Saito, Tokyo (JP); Kanta Dei, Tokyo (JP)

(73) Assignee: SENJU METAL INDUSTRY CO., LTD., Tokyo (JP)

(*) Notice: Subject to any disclaimer, the term of this patent is extended or adjusted under 35 U.S.C. 154(b) by 0 days.

(21) Appl. No.: 17/042,551

(22) PCT Filed: Mar. 22, 2019

(86) PCT No.: PCT/JP2019/012009
§ 371 (c)(1),
(2) Date: Sep. 28, 2020

(87) PCT Pub. No.: WO2019/188756
PCT Pub. Date: Oct. 3, 2019

(65) Prior Publication Data
US 2021/0114143 A1 Apr. 22, 2021

(30) Foreign Application Priority Data
Mar. 30, 2018 (JP) .............. JP2018-070271
Sep. 28, 2018 (JP) .............. JP2018-184823

(51) Int. Cl.
B23K 35/02 (2006.01)
B23K 35/26 (2006.01)
(Continued)

(52) U.S. Cl.
CPC .......... *B23K 35/025* (2013.01); *B23K 35/264* (2013.01); *B23K 35/362* (2013.01); *B23K 2103/08* (2018.08)

(58) Field of Classification Search
CPC ..................... B23K 35/025; B23K 35/264
(Continued)

(56) References Cited
U.S. PATENT DOCUMENTS
9,837,757 B2 * 12/2017 Yoshikawa .............. H01R 4/02
2003/0178101 A1 * 9/2003 Ono .................. C22C 13/00
420/561
(Continued)

FOREIGN PATENT DOCUMENTS
CN 1672859 A * 9/2005
CN 102513720 6/2012
(Continued)

OTHER PUBLICATIONS
International Search Report for App. No. PCT/JP2019/012009, dated Mar. 22, 2019.
(Continued)

Primary Examiner — Weiping Zhu
(74) Attorney, Agent, or Firm — Nixon Peabody LLP; Jeffrey L. Costellia

(57) ABSTRACT
Provided is a solder paste which uses a conventional flux, and for which long-term preservation is made possible and an easy preservation method can be realized by suppressing changes in the viscosity of the paste over time. This solder paste is provided with a solder powder, a zirconium oxide powder, and a flux, and changes in the viscosity of the paste over time are suppressed.

7 Claims, 1 Drawing Sheet

(51) Int. Cl.
　　*B23K 35/362*　　(2006.01)
　　*B23K 103/08*　　(2006.01)
(58) Field of Classification Search
　　USPC .......................................................... 420/577
　　See application file for complete search history.

(56) References Cited

U.S. PATENT DOCUMENTS

| | | | | |
|---|---|---|---|---|
| 2016/0271737 | A1* | 9/2016 | Ikeda | B23K 35/0227 |
| 2017/0225277 | A1 | 8/2017 | Sharma et al. | |
| 2018/0029169 | A1* | 2/2018 | Arai | B23K 35/26 |

FOREIGN PATENT DOCUMENTS

| | | |
|---|---|---|
| CN | 103551756 | 2/2014 |
| CN | 105033496 | 11/2015 |
| CN | 105431253 | 3/2016 |
| EP | 0856376 | 8/1998 |
| JP | 60-061180 | 4/1985 |
| JP | 61-115683 | 6/1986 |
| JP | 05-237662 | 9/1993 |
| JP | 05-261586 | 10/1993 |
| JP | 10-180483 | 7/1998 |
| JP | 2013-046929 | 3/2013 |
| JP | 2013-258254 | 12/2013 |
| JP | 2015-020181 | 2/2015 |
| JP | 2015-020182 | 2/2015 |
| JP | 2017-073448 | 4/2017 |
| JP | 2017-528327 | 9/2017 |

OTHER PUBLICATIONS

Chinese Office Action (Application No. 201980022343.9) dated Jul. 2, 2021.
Extended European Search Report in European App. No. 19776738.7, dated Nov. 16, 2021 (8 pages).
Korean Notice of Allowance in Korean App. No. 10-2020-7027924, dated Aug. 24, 2021 (4 pages).

* cited by examiner

SOLDER PASTE

TECHNICAL FIELD

The present invention relates to a solder paste that can be stored for a long time and can realize an easy storage method.

BACKGROUND ART

Generally, a solder paste is used for joining an electronic component and a printed board. The solder paste is composed of solder powder and a flux such as a base resin, an activator, and a solvent. As the activator contained in the flux, a highly active activator is used to remove the oxide film formed on the surface of the solder powder and ensure wettability.

However, since the highly active activator reacts with the solder particles over time when the solder paste is stored, the viscosity of the solder paste increases. Since the solder paste is applied to the electrodes of the printed circuit board via a metal mask by screen printing or the like, when the viscosity increases, the printing performance on the electrodes is remarkably deteriorated. In recent years, there has been a demand for downsizing electronic components used in electronic devices as electronic devices become smaller and higher performance. Since miniaturized electronic components are mounted on a printed board with high density, the electrodes of the printed board are also required to be miniaturized. When the printing performance of the solder paste deteriorates, it becomes difficult to print the solder paste on fine electrodes. For this reason, improvement in storage stability of solder paste is further required.

PTL 1 discloses a solder paste having a flux in which a predetermined base resin and a brominated activator component having a specific structure are combined in order to improve storage stability. A base resin containing a polymerized rosin is used as the predetermined base resin, and a brominated activator comprising a diol and a quaternary carbon-containing diol is disclosed as a brominated activator component having a specific structure. In this document, a solder powder having an alloy composition of Sn-3Ag-0.5Cu is used, and the viscosity immediately after preparation thereof and the viscosity after being kept in a constant temperature bath at 40° C. for 24 hours are measured, and the thickening rate of the solder paste is evaluated.

CITATION LIST

Patent Literature

[PTL 1] Japanese Unexamined Patent Application, First Publication No. 2013-046929

SUMMARY OF INVENTION

Technical Problem

In the invention described in PTL 1, as described above, storage stability is improved by combining a predetermined base resin and a bromine-based activator component having a specific structure. That is, the invention described in the document focuses on the component of the flux. However, since changing the flux component may cause various problems such as residues after joining, changing the flux component may cause various problems.

Under the above circumstances, the object of this invention is providing a solder paste which is easily preserved and is preserved for a long period of time by suppressing the change in viscosity over time using a conventional flux.

Solution to Problem

In order to solve the above problems, the present inventors did not focus on the flux component as in the conventional art, but studied the means to exert the inhibitory effect by reexamining the cause of the thickening of the solder paste. The activator contained in the flux is highly reactive and reacts with the solder powder over time when the solder paste is stored, leading to thickening of the paste. As a result of further detailed investigation, it was found that, although the solder powder is initially covered with an oxide film, because of focusing too much on wettability with the electrode, the oxide film becomes thin due to an acid-base reaction with the activator, and a large amount of the organic acid Sn salt was generated and the viscosity increased. Further, it was found that the $SnO_2$ film thickness on the surface of the solder powder was reduced by the oxidation-reduction reaction in the solder powder flux, and the viscosity of the solder paste was increased.

From these findings, the present inventors focused on the fact that, if the above redox reaction and acid-base reaction may be suppressed simultaneously, the thickness of the oxide film on the surface of the solder powder present in the solder paste may be maintained even after being introduced into the flux, and the formation of organic acid Sn salt may be suppressed. That is, the inventors focused on the necessity of suppressing various reactions in the flux such that the surface state of the initial solder powder charged into the flux may be maintained for a long time in the flux.

Accordingly, the present inventors have conducted intensive studies focusing on metal oxides as substances that exist stably in the flux in order to suppress the reaction between the solder powder and the activator. Various metal oxides and their contents were adjusted to measure the change in viscosity of the solder paste over time. The present inventors found that, among metal oxides, zirconium oxide was conventionally not used as a reaction inhibitor because of its catalytic action, but unexpectedly, when a predetermined amount of zirconium oxide powder is added, an increase in the viscosity of the solder paste may be suppressed. The present invention was completed based on these findings.

The present invention obtained from these findings is as follows.

(1) A solder paste in which change in viscosity over time is suppressed, the solder paste including:
a solder powder containing 42 mass % or more of Sn, a zirconium oxide powder, and a flux:
wherein the solder paste contains 0.05 to 20.0% by mass of zirconium oxide powder with respect to the total mass of the solder paste.

(2) The solder paste as described in (1) above,
wherein the solder powder contains Ag: more than 0% and 10.0% or less, in terms of mass %.

(3) The solder paste as described in (1) or (2) above,
wherein the solder powder contains Cu: more than 0% and 10.0% or less, in terms of mass %.

(4) The solder paste as described in any one of (1) to (3) above,
wherein the solder powder contains Bi: more than 0% and 58% or less, in terms of mass %.

(5) The solder paste as described in any one of (1) to (4) above, wherein the solder powder contains Sb: more than 0% and 20.0% or less, in terms of mass %.

(6) The solder paste as described in any one of (1) to (5) above, wherein the solder powder contains Ni: more than 0% and 20.0% or less, in terms of mass %.

(7) The solder paste as described in any one of (1) to (6) above, wherein the solder powder further contains one or more selected from the group consisting of Co, Mn, Fe, Ge, Ga, Au, and Pt: more than 0% and 10.0% or less, in terms of mass %.

(8) The solder paste as described in (1), wherein the solder powder consists of Ag: 3.2 to 3.8%, Cu: 0.6 to 0.8%, Sb: 2 to 5%, Ni: 0.01 to 0.2%, Bi: 1.5 to 5.5%, and the balance Sn, in terms of mass %.

(9) The solder paste as described in (8) above, wherein the solder powder contains Co: 0.01 to 0.1%, in terms of mass %.

(10) The solder paste as described in any one of (1) to (9) above, wherein a particle size of the zirconium oxide powder is 5 μm or less.

DESCRIPTION OF EMBODIMENTS

Figure 1:
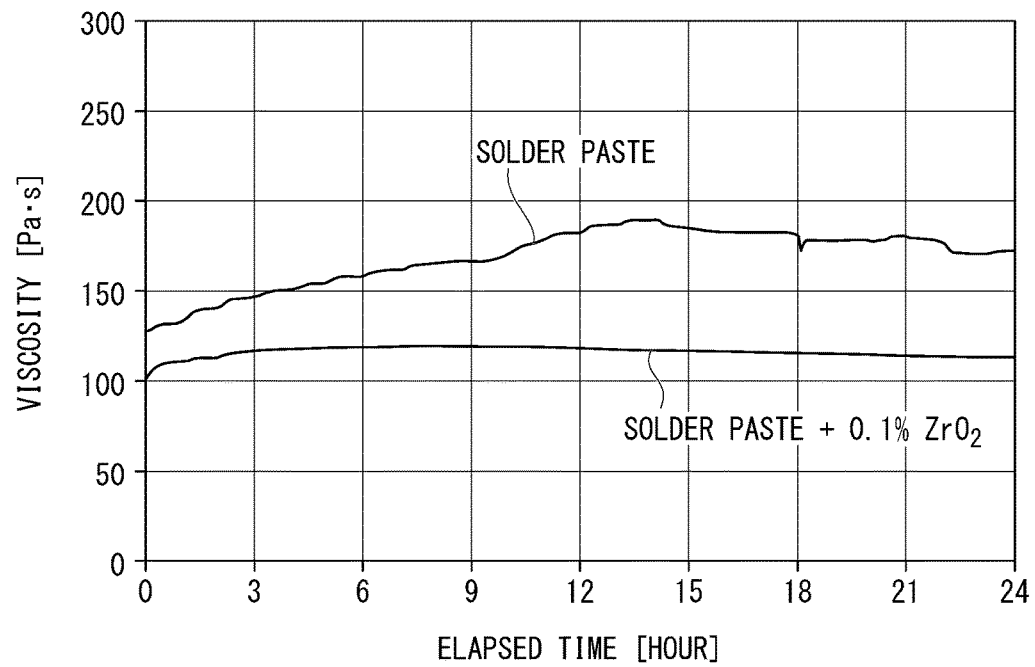
FIG. 1 is a view showing a change over time in the viscosity of a solder paste.

The invention is described in more detail below. In this specification, "%" regarding each component constituting the solder paste and the solder alloy composition is "% by mass" unless otherwise specified.

1. Solder Paste

The solder paste according to the present invention includes a solder powder, a solder composition composed of zirconium oxide powder, and a flux, the solder paste contains 0.05 to 20.0% by mass of zirconium oxide powder with respect to the total mass of the solder paste, and the change in viscosity over time is suppressed. Below, each component is explained in detail.

(1) Zirconium Oxide Powder (1-1) Viscosity with Time is Suppressed

Since the solder paste according to the present invention contains zirconium oxide powder, it is possible to suppress an increase in the viscosity of the paste with time. This is presumably because, by virtue of the solder paste containing zirconium oxide, the oxide film thickness on the surface of the solder powder is maintained even after the solder powder is put into the flux. Although details have not been elucidated yet, it is presumed as follows. Usually, since the active component of the flux has a slight activity even at room temperature, the surface oxide film of the solder powder becomes thin by reduction, causing the powders to aggregate. It is presumed that, by adding a predetermined amount of zirconium oxide powder to the solder paste, the active component of the flux reacts preferentially with the zirconium oxide powder, and the oxide film on the surface of the solder powder is maintained so as not to aggregate.

The above finding has been obtained for the purpose of extending the storage period of the solder paste and simplifying the storage method. Conventionally, since zirconium oxide has a catalytic action, it has been considered that zirconium oxide should not be contained in order to suppress the thickening action by the activator. For this reason, the technical idea for achieving such an object with zirconium oxide could not be expected in the conventional art. The solder paste according to the present invention, which has been completed based on the above findings, can suppress a change in viscosity over time without using a special flux component.

In the present invention, the viscosity is a result of measurement at a rotation speed of 10 rpm, 25° C. in air, using a PCU-205 manufactured by Malcolm Corporation. In the present invention, suppressing the change in viscosity with time means that the rate of change between the viscosity immediately after mixing the solder powder, zirconium oxide, and the flux and the viscosity after continuously measuring the viscosity under the above conditions for 24 hours is within ±30%.

(1-2) Zirconium Oxide Content: 0.05 to 20.0%

In order to sufficiently exhibit such effects, it is necessary to set the content of the zirconium oxide powder in the solder paste to 0.05 to 20.0%. If the content of the zirconium oxide powder in the solder paste is less than 0.05%, the above-mentioned effects cannot be exhibited. If the content of the zirconium oxide powder in the solder paste exceeds 20.0%, the content of the metal powder cannot be ensured and the effect of preventing thickening cannot be exhibited. The content of zirconium oxide is preferably 0.05 to 10.0%, and more preferably 0.1 to 3%.

(1-3) Particle Size

The particle size of the zirconium oxide powder in the solder paste is preferably 5 μm or less. When the particle size is 5 μm or less, the printability of the paste may be maintained. The lower limit is not particularly limited, but may be 0.5 μm or more.

In the present invention, regarding the particle diameter of zirconium oxide, an SEM photograph of zirconium oxide powder is taken, and a projected circle equivalent diameter is obtained by image analysis for each particle present in the visual field, and the particle diameter of zirconium oxide is defined as an average value of the projected circle equivalent diameters of 0.1 μm or more.

(1-4) Shape

The shape of the zirconium oxide is not particularly limited, but if the shape is aberrant, the contact area with the flux is large, and a thickening suppressing effect may be obtained. If the shape is spherical, good fluidity is obtained, such that excellent printability as a paste may be obtained. The shape may be appropriately selected depending on desired characteristics.

2. Solder Powder (2-1) Alloy Composition

As the solder powder of the present invention, for example, Sn—Cu solder alloy, Sn—Ag solder alloy, Sn—Sb solder alloy, Sn—Bi solder alloy, Sn—Zn solder alloy, Sn—Pb solder alloy, Sn—In solder alloy, Bi—Cu solder alloy, Zn—Al solder alloy, or Bi—Ag solder alloy may be used. Moreover, the solder powder of the present invention may have an alloy composition in which these solder alloys are combined. When the solder powder of the present invention contains Ag, Cu, Bi, Sb, and Ni, the respective contents are as follows.

When the solder powder contains Ag, the Ag content is preferably more than 0% and 10.0% or less. When the Ag content is within this range, the wettability improvement effect of the solder alloy is exhibited. Further, when the Ag content is within this range, and effect of improving a network-like compound of $Ag_3Sn$ intermetallic compound is precipitated in the solder matrix to form a precipitation dispersion strengthened type alloy, so as to improve the temperature cycle characteristics.

When the solder powder contains Cu, the Cu content is preferably more than 0% and 10.0% or less. When the Cu content is within this range, an effect of preventing Cu erosion with respect to Cu lands is exhibited. Further, when the Cu content is within this range, a fine $Cu_6Sn_5$ compound is precipitated in the solder matrix, so as to improve the temperature cycle characteristics.

When the solder powder contains Bi, the Bi content is preferably more than 0% and 58% or less. When the Bi content is within this range, the temperature cycle characteristics may be improved. Sb not only precipitates SnSb intermetallic compounds to form precipitation-dispersion strengthened alloys, but also improves the temperature cycle characteristics by entering the atomic arrangement lattice and replacing Sn to distort the atomic arrangement lattice to strengthen the Sn matrix. At this time, if Bi is contained in the solder, Bi is replaced with Sb, so that the temperature cycle characteristics may be further improved. This is because Bi has a larger atomic weight than Sb and has a great effect of distorting the lattice of the atomic arrangement. Further, Bi does not prevent the formation of fine SnSb intermetallic compounds, and a precipitation dispersion strengthened solder alloy is maintained.

When the solder powder contains Sb, the Sb content is preferably more than 0% and 20.0% or less. When the Sb content is within this range, a form in which Sb is dispersed in the Sn matrix appears, and the effect of solid solution strengthening is exhibited. Furthermore, the shear strength of the solder joint is also increased. Moreover, the rise in the liquidus temperature may be suppressed, the coarsening of the SnSb intermetallic compound may be suppressed, and the propagation of cracks in the solder may be suppressed. Furthermore, since the rise of the liquidus temperature is suppressed, Cu wired on the surface of the printed board does not melt in the solder, and the intermetallic compound layer of SnCu such as $Cu_6Sn_5$ does not become thick, such that the solder joints may be hardly broken.

When the solder powder contains Ni, the Ni content is preferably more than 0% and 20.0% or less. When the Ni content is within this range, the intermetallic compound in the intermetallic compound layer generated in the vicinity of the soldering interface is miniaturized to suppress the generation of cracks, to suppress the propagation of cracks once generated, making it possible to suppress the generation and propagation of cracks from the bonding interface.

The alloy composition of the solder powder of the present invention is preferably Ag: 3.2 to 3.8%, Cu: 0.6 to 0.8%, Sb: 2 to 5%, Ni: 0.01 to 0.2%, Bi: 1.5 to 5.5%, and remaining Sn. When the alloy composition is within this range, the above effects may be exhibited simultaneously.

The solder powder may contain, as an arbitrary element, at least one of Co, Mn, Fe, Al, Ge, Ga, P, Au, Pt, and Zr in total more than 0% and 10.0% or less. Even if such arbitrary element is contained in the solder powder, the paste does not thicken. When a predetermined amount of Co is contained, the structure of the solder powder may be made fine. The lower limit of the Co content is preferably more than 0.01%, more preferably 0.03% or more. On the other hand, in order to suppress an increase in the melting point of the solder powder, the upper limit of the Co content is preferably 0.1% or less, more preferably 0.05% or less.

The Balance: Sn

The balance of the solder powder composition according to the present invention is Sn. The solder powder may contain inevitable impurities in addition to the aforementioned elements. Even when inevitable impurities are contained, the above-mentioned effects are not affected.

(2-2) Solder Powder Content in Solder Paste

The solder paste according to the present invention preferably contains 35 to 95% of solder powder with respect to the total mass of the solder paste. When the amount of the solder powder is within this range, the amount becomes sufficient to exhibit the effect of the addition of each of the other components, such that the solder paste has various characteristics such as printability.

(2-3) Other Properties of Solder Powder

If the solder powder of the present invention has a size (particle size distribution) corresponding to symbols 1 to 8 in the powder size classification (Table 2) in JIS Z 3284-1: 2014, the solder powder may be soldered to fine parts. The size of the particulate solder material is more preferably a size corresponding to symbols 4 to 8, and more preferably a size corresponding to symbols 5 to 8. Further, the shape of the solder powder is not particularly limited, but if the shape is spherical, good fluidity may be obtained, such that excellent printability as a paste may be obtained. In such case, the sphericity is preferably 0.90 or more, more preferably 0.95 or more, and most preferably 0.99 or more.

3. Flux (3-1) Flux Composition

The solder paste according to the present invention includes a flux composition. The flux composition is one of organic acid, amine, amine hydrohalide, organic halogen compound, thixotropic agent, rosin, solvent, surfactant, base agent, polymer compound, silane coupling agent, colorant, or a combination of two or more.

Examples of organic acids include succinic acid, glutaric acid, adipic acid, pimelic acid, suberic acid, azelaic acid, sebacic acid, dimer acid, propionic acid, 2,2-bishydroxymethylpropionic acid, tartaric acid, malic acid, glycolic acid, diglycolic acid, thioglycolic acid, dithioglycolic acid, stearic acid, 12-hydroxystearic acid, palmitic acid, and oleic acid.

Examples of amines include ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-Phenyl-4-methylimidazole, 1-benzyl-2-methylimidazole, 1-benzyl-2-phenylimidazole, cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1)]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-Methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-ethyl-5-hydroxymethylimidazole, 2,3-dihydro-1H-pyrrolo[1,2-a]benzimidazole, 1-dodecyl-2-Methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl) benzo imidazole, 2-nonylbenzimidazole, 2-(4-thiazolyl) benzimidazole, benzimidazole, 2-(2'-hydroxy-5'-methylphenyl) benzotriazole, 2-(2'-hydroxy-3'-tert-butyl-5'-methylphenyl)-5-chlorobenzotriazole, 2-(2'-hydroxy-3',5'-di-tert-amylphenyl) benzotriazole, 2-(2'-hydroxy-5'-tert-octylphenyl) benzotriazole, 2,2'- methylenebis [6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis (2-ethylhexyl) aminomethyl] benzotriazole, carboxybenzotriazole, 1-[N,N-bis (2-ethylhexyl) aminomethyl] methylbenzotriazole, 2,2'-[[(methyl-1H-benzotriazol-1-yl) methyl] imino] bisethanol, 1-(1',2'-dicarboxyethyl) benzotriazole, 1-(2,3-dicarboxypropyl) benzotriazole, 1-[(2-ethylhexylamino) methyl] benzotriazole, 2,6-bis [(1H-benzotriazol-1-yl) methyl]-4-methylphenol, 5-methylbenzotriazole, and 5-phenyltetrazole.

An amine hydrohalide is a compound obtained by reacting an amine with a hydrogen halide. Examples of the amine include ethylamine, ethylenediamine, triethylamine, methylimidazole, and 2-ethyl-4-methylimidazole. Examples of the hydrogen halide include hydrides of chlorine, bromine, and iodine.

Examples of the organic halogen compounds include 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

Examples of thixotropic agents include wax-based thixotropic agents, and amide-based thixotropic agents. Examples of the wax-based thixotropic agent include castor oil. Examples of amide thixotropic agents include lauric acid amide, palmitic acid amide, stearic acid amide, behenic acid amide, hydroxystearic acid amide, saturated fatty acid amide, oleic acid amide, erucic acid amide, unsaturated fatty acid amide, p-toluene methane amide, aromatic amide, methylene his stearic acid amide, ethylene his lauric acid amide, ethylene his hydroxystearic acid amide, saturated fatty acid bis amide, methylene bis oleic acid amide, unsaturated fatty acid his amide, m-xylylene bis stearic acid amide, aromatic bis amide, saturated fatty acid polyamide, unsaturated fatty acid polyamide, aromatic poly amide, substituted amide, methylol stearic acid amide, methylol amide, and fatty acid ester amide.

Examples of the base agent include rosin, polymer resin, and polyethylene glycol. Examples of the rosin include material rosins such as gum rosin, wood rosin and tall oil rosin, and derivatives obtained from the raw rosin. Examples of the derivatives include purified rosin, hydrogenated rosin, disproportionated rosin, polymerized rosin, and α,β-unsaturated carboxylic acid-modified products (such as acrylated rosin, maleated rosin, and fumarated rosin), and purified products, hydrides and disproportionates of the polymerized rosin, and purified products, hydrides and disproportions of the α,β-unsaturated carboxylic acid-modified products, and two or more of them may be used. In addition to rosin, the base agent can further contain at least one or more resins, as the polymer resin, selected from acrylic resin, terpene resin, modified terpene resin, terpene phenol resin, modified terpene phenol resin, styrene resin, modified styrene resin, xylene resin, and modified xylene resin. Further, as a base agent, only a polymer resin may be used instead of rosin. As the modified terpene resin, aromatic modified terpene resin, hydrogenated terpene resin, hydrogenated aromatic modified terpene resin may be used. As the modified terpene phenol resin, a hydrogenated terpene phenol resin or the like may be used. As the modified styrene resin, a styrene acrylic resin, a styrene maleic acid resin, or the like may be used. Examples of the modified xylene resin include phenol-modified xylene resin, alkylphenol-modified xylene resin, phenol-modified resole-type xylene resin, polyol-modified xylene resin, and polyoxyethylene-added xylene resin.

Examples of the solvent include water, alcohol solvents, glycol ether solvents, and terpineols. Examples of alcohol solvents include isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris (hydroxymethyl) ethane, 2-ethyl-2-hydroxymethyl-1,3-propanediol, 2,2'-oxybis (methylene) bis (2-ethyl-1,3-propanediol), 2,2-bis (hydroxymethyl) 1,3-propanediol, 1,2,6-trihydroxyhexane, bis [2,2,2-tris (hydroxymethyl) ethyl] ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, and 2,4,7,9-tetramethyl-5-decyne-4,7-diol. Examples of glycol ether solvents include diethylene glycol mono-2-ethylhexyl ether, ethylene glycol monophenyl ether, 2-methylpentane-2,4-diol, diethylene glycol monohexyl ether, diethylene glycol dibutyl ether, and triethylene glycol monobutyl ether.

Examples of the surfactant include polyoxyalkylene acetylene glycols, polyoxyalkylene glyceryl ether, polyoxyalkylene alkyl ether, polyoxyalkylene ester, polyoxyalkylene alkylamine, and polyoxyalkylene alkylamide.

Known silane coupling agents and colorants may be used as appropriate.

(2) Flux Content

The flux content is preferably 5 to 60% with respect to the total mass of the solder paste. Within this range, the effect of suppressing thickening due to the solder powder is sufficiently exhibited.

EXAMPLES

The materials ho in Table 1 below e mixed in each part by mass to prepare a flux.

TABLE 1

| | Material | Flux A: | Flux B: | Flux C: | Flux D: |
|---|---|---|---|---|---|
| Rosin | Acid-modified hydrogenated rosin | 40 | 40 | 35 | 45 |
| | Polymerized rosin | | | | |
| Organic acid | Organic dibasic acid | 2 | 2 | | |
| | Polymeric organic acid | | 18 | | |
| Amine | Imidazole accelerator | 5 | | 35 | |
| Halogen | Amine hydrohalide | 1 | | | 10 |
| Solvent | Glycol ether | 47 | 35 | 30 | 43 |
| Thixotropic agent | Hydrogenated castor oil | 5 | 5 | | 2 |
| | Total (mass %) | 100 | 100 | 100 | 100 |

Using each flux shown in Table 1, a solder paste was prepared by mixing each of the flux, powder (solder powder), and $ZrO_2$ (zirconium oxide powder) in the amount (in terms of parts by mass) as shown in Tables 2 to 6.

The particle sizes of the powders shown in Tables 2 to 6 are sizes (particle size distributions) satisfying the symbol 4 in the powder size classification (Table 2) in JIS Z 3284-1: 2014.

The viscosities shown in Tables 2 to 6 were measured at a rotational speed of 10 rpm and 25° C. in air using PCU-205 manufactured by Malcolm Corporation. If the rate of change between the viscosity immediately after mixing the solder powder, zirconium oxide, and the flux and the viscosity after continuously measuring the viscosity under the above conditions for 24 hours is within ±30%, the change in viscosity over time is at a level that does not cause a problem in practice, and therefore, "O" is given. When it was not within the range off 30%, "X" was given.

Details of each material in Tables 2 to 6 are as follows.
Alloy composition A; Cu: 0.7%, balance: Sn
Alloy composition B: Ag: 3.0%, Cu: 0.5%, balance: Sn
Alloy composition C: Ag: 3.4%, Cu: 0.7%, Sb: 3.0%, Bi: 3.2%, Ni: 0.04%, Co: 0.01%, balance: Sn
Alloy composition D: Ag: 3.5%, balance: Sn
Alloy composition E; Ag: 3.5%, Cu: 0.5%, Sb: 3.0%, balance: Sn
Alloy composition F; Ag: 3.0%, Cu: 0.5%, Ge: 0.03%, balance: Sn
Alloy composition G; Ag: 3.0%, Cu: 0.5%, Fe: 0.04%, balance: Sn
Alloy composition H; Ag: 3.0%, Cu: 0.5%, Co: 0.08%, balance: Sn
Alloy composition I; Ag: 15%, Cu: 0.5%, Bi: 10%, Ni: 0.02%, balance: Sn
Alloy composition J; Sb: 5.0%, balance: Sn
Alloy composition K; Bi: 58%, balance: Sn
Alloy composition L; In: 52%, balance: Sn
Alloy composition M: Al: 2.0%, balance: Zn

TABLE 4

| | | Example 16 | Comparative Example 7 | Comparative Example 8 |
|---|---|---|---|---|
| Flux Powder | Flux C | 11 | 11 | 11 |
| | Composition A, particle size: symbol 4 | | | |
| | Composition B, particle size: symbol 4 | | | |
| | Composition C, particle size: symbol 4 | 89 | 89 | 89 |
| $ZrO_2$ | $\phi 1\ \mu m$ | 0.05 | 0.01 | 0 |
| Total (parts by mass) | | 100.05 | 100.01 | 100 |
| Viscosity | | ○ | X | X |

TABLE 2

| | | Comparative Example 1 | Example 1 | Example 2 | Example 3 | Example 4 | Example 5 | Example 6 | Example 7 | Example 8 | Comparative Example 2 | Comparative Example 3 |
|---|---|---|---|---|---|---|---|---|---|---|---|---|
| Flux Powder | Flux A | 11 | 11 | 11 | 11 | 11 | 11 | 11 | 11 | 11 | 11 | 11 |
| | Composition A, particle size: symbol 4 | | 89 | 89 | | | | 89 | | | | |
| | Composition B, particle size: symbol 4 | | | | | | | | 89 | | | |
| | Composition C, particle size: symbol 4 | 89 | | | 89 | 89 | | | | 89 | 89 | 89 |
| $ZrO_2$ | $\phi 1\ \mu m$ | 30 | 20 | 5 | 1 | 1 | 0.1 | 0.05 | 0.05 | 0.05 | 0.01 | 0 |
| Total (parts by mass) | | 130 | 120 | 105 | 101 | 101 | 100.1 | 100.05 | 100.05 | 100.05 | 100.01 | 100 |
| Viscosity | | — | ○ | ○ | ○ | ○ | ○ | ○ | ○ | ○ | X | X |

TABLE 3

| | | Comparative Example 4 | Example 9 | Example 10 | Example 11 | Example 12 | Example 13 | Example 14 | Example 15 | Comparative Example 5 | Comparative Example 6 |
|---|---|---|---|---|---|---|---|---|---|---|---|
| Flux Powder | Flux B | 11 | 11 | 11 | 11 | 11 | 11 | 11 | 11 | 11 | 11 |
| | composition A, particle size: symbol 4 | | 89 | 89 | | | 89 | | | | |
| | composition B, particle size: symbol 4 | | | | | | | 89 | | | |
| | composition C, particle size: symbol 4 | 89 | | | 89 | | | | 89 | 89 | 89 |
| $ZrO_2$ | $\phi 1\ \mu m$ | 30 | 20 | 5 | 1 | 0.1 | 0.05 | 005 | 0 05 | 0.01 | 0 |
| Total (parts by mass) | | 130 | 120 | 105 | 101 | 100.1 | 100.05 | 100.05 | 100.05 | 100.01 | 100 |
| Viscosity | | — | ○ | ○ | ○ | ○ | ○ | ○ | ○ | X | X |

TABLE 5

| | | Example 17 | Comparative Example 9 | Comparative Example 10 |
|---|---|---|---|---|
| Flux | Flux D | 11 | 11 | 11 |
| Powder | Composition A, particle size: symbol 4 | | | |
| | Composition B, particle size: symbol 4 | | | |
| | Composition C, particle size: symbol 4 | 89 | 89 | 89 |
| $ZrO_2$ | φ1 μm | 1 | 0.01 | 0 |
| Total (parts by mass) | | 101 | 100.01 | 100 |
| Viscosity | | ○ | X | X |

TABLE 6

| | | Example 18 | Example 19 | Example 20 | Example 21 | Example 22 | Example 23 | Example 24 | Example 25 | Example 26 | Reference Example 27 |
|---|---|---|---|---|---|---|---|---|---|---|---|
| Flux | Flux A | 11 | 11 | 11 | 11 | 11 | 11 | 11 | 11 | 11 | 11 |
| Powder | Composition D, particle size: symbol 4 | 89 | | | | | | | | | |
| | Composition E, particle size: symbol 4 | | 89 | | | | | | | | |
| | Composition F, particle size: symbol 4 | | | 89 | | | | | | | |
| | Composition G, particle size: symbol 4 | | | | 89 | | | | | | |
| | Composition H, particle size: symbol 4 | | | | | 89 | | | | | |
| | Composition I, particle size: symbol 4 | | | | | | 89 | | | | |
| | Composition J, particle size: symbol 4 | | | | | | | 89 | | | |
| | Composition K, particle size: symbol 4 | | | | | | | | 89 | | |
| | Composition L, particle size: symbol 4 | | | | | | | | | 89 | |
| | Composition M, particle size: symbol 4 | | | | | | | | | | 89 |
| $ZrO_2$ | φ 1 μm | 0.1 | 0.1 | 0.1 | 0.1 | 0.1 | 0.1 | 0.1 | 0.1 | 0.1 | 0.1 |
| Total (parts by mass) | | 100.1 | 100.1 | 100.1 | 100.1 | 100.1 | 100.1 | 100.1 | 100.1 | 100.1 | 100.1 |
| Viscosity | | ○ | ○ | ○ | ○ | ○ | ○ | ○ | ○ | ○ | ○ |

In the examples of Tables 2 to 6, it was found that the change in viscosity over time was suppressed because the solder paste contained an appropriate amount of $ZrO_2$.

On the other hand, Comparative Examples 1 and 4 containing excess amount of $ZrO_2$ could not form a solder paste, and their viscosity could not be measured. In Comparative Examples 2, 5, 7, and 9 in which the amount of $ZrO_2$ was too small, and in Comparative Examples 3, 6, 8, 10 which do not contain $ZrO_2$, changes in viscosity over time were observed. Here, the results of Tables 2 to 6 will be described in detail with reference to the drawings.

FIG. 1 is a view showing a change with time in the viscosity of a solder paste. In FIG. 1, "solder paste" is Comparative Example 3, and "solder paste+0.1% $ZrO_2$" is Example 5. As can be seen from FIG. 1, in Example 5 containing $ZrO_2$, the viscosity hardly changes. On the other hand, in the Comparative Example 3 which does not contain $ZrO_2$, it turned out that the viscosity rises rapidly. The reason for this result is presumed to be that the oxide film thickness on the powder surface becomes thin and the powder agglomerates, so the oxide film thickness on the powder surface was measured.

Figure 2:
FIG. 2 is a diagram showing the results of measuring the surface oxide film thickness of the solder powder.

FIG. 2 is a diagram showing the results of measuring the surface oxide film thickness of the solder powder. "Solder powder+1% $ZrO_2$" is Example 4, "Solder powder+0.1% $ZrO_2$" is Example 5, and "Solder powder" is Comparative Example 3. The oxide film thickness shown in FIG. 2 was measured by using AES (model number: PHI-700) manufactured by ULVAC-PHI, with an acceleration voltage of 10 kV and a current value of 10 A. The obtained film thickness is the $SiO_2$ equivalent thickness. Further, the measured powder of the oxide film thickness is obtained by extracting the powder from the solder paste after the viscosity is continuously measured for 24 hours. The oxide film thickness of the solder powder before mixing with the flux was 3.4 nm on an average of 10 samples.

As apparent from FIG. 2, it was found that the decrease in the oxide film thickness was suppressed as the $ZrO_2$ content increased. This is presumably because the active component in the flux reacted preferentially with $ZrO_2$. It was found that the initial film thickness was maintained when the $ZrO_2$ content was 1%. When the $ZrO_2$ content is 0.1%, the oxide film thickness is thin, but a large amount of oxide film remains, such that the aggregation of the solder powder is suppressed, so as to exhibit the effect of preventing thickening as shown in FIG. 1. On the other hand, when $ZrO_2$ is not contained, the oxide film thickness is the thinnest, and the viscosity increases as shown in FIG. 1.

The invention claimed is:

1. A solder paste in which change in viscosity over time is suppressed, the solder paste comprising:
    a mixture of a solder powder containing 42 mass % or more of Sn, a zirconium oxide powder, and a flux, the zirconium oxide powder being present in the mixture independent from the solder powder,
    wherein the solder paste contains 0.05 to 20.0% by mass of zirconium oxide powder with respect to the total mass of the solder paste; and
    the solder powder consists of:
        Sn; or
        Sn and at least one or more selected from a group consisting of Ag, Cu, Bi, Sb, Pb, Zn, Al, Co, Mn, Fe, Ge, Ga, P, Au, Pt, and Zr.

2. The solder paste according to claim 1, wherein the solder powder contains Ag: more than 0% and 10.0% or less, in terms of mass %, with respect to the total mass of the solder powder.

3. The solder paste according to claim 1, wherein the solder powder contains Cu: more than 0% and 10.0% or less, in terms of mass %, with respect to the total mass of the solder powder.

4. The solder paste according to claim 1, wherein the solder powder contains Bi: more than 0% and 58% or less, in terms of mass %, with respect to the total mass of the solder powder.

5. The solder paste according to claim 1, wherein the solder powder contains Sb: more than 0% and 20 0.0% or less, in terms of mass %, with respect to the total mass of the solder powder.

6. The solder paste according to claim 1, wherein the solder powder contains one or more selected from the group consisting of Co, Mn, Fe, Ge, Ga, Au, and Pt: more than 0% and 10.0% or less, in terms of mass %, with respect to the total mass of the solder powder.

7. The solder paste according to claim 1, wherein a particle size of the zirconium oxide powder is 0.5 μm or more and 5 μm or less.

* * * * *